(12) United States Patent
Bednarczyk et al.

(10) Patent No.: US 6,257,302 B1
(45) Date of Patent: Jul. 10, 2001

(54) SOLAR-ENERGY SIDING SYSTEM AND ASSEMBLY

(76) Inventors: Adam Bednarczyk, 154 Seton Pl., Streamwood, IL (US) 60107; Anna Bednarczyk, Ul. Neseberska 3 m.8, 02-758, Warsaw (PL)

( * ) Notice: Subject to any disclaimer, the term of this patent is extended or adjusted under 35 U.S.C. 154(b) by 0 days.

(21) Appl. No.: 09/521,376

(22) Filed: Mar. 8, 2000

(30) Foreign Application Priority Data

Mar. 8, 1999 (PL) ........................................... 331820

(51) Int. Cl.$^7$ ............................................... E06B 9/42
(52) U.S. Cl. ...................................................... 160/98
(58) Field of Search ........................... 160/98, 107, 23.1, 160/26, 33, 133, 121.1

(56) References Cited

U.S. PATENT DOCUMENTS

| | | |
|---|---|---|
| 3,616,139 | 10/1971 | Jones . |
| 4,301,787 * | 11/1981 | Rice ................................. 160/107 X |
| 4,327,795 * | 5/1982 | Wheeler ................................. 160/98 |
| 4,508,154 * | 4/1985 | Wheeler ................................. 160/98 |
| 4,577,619 * | 3/1986 | Howe ................................. 160/107 X |
| 4,649,980 * | 3/1987 | Kunz ....................................... 160/98 |
| 4,658,806 * | 4/1987 | Boozer .............................. 160/107 X |
| 5,720,137 * | 2/1998 | Rodriquez ........................... 160/98 X |
| 5,888,614 | 3/1999 | Slocum et al. . |

FOREIGN PATENT DOCUMENTS

| | | |
|---|---|---|
| 37 02214 A1 | 11/1987 | (DE) . |
| 938294 | of 1948 | (FR) . |
| 53026 | 7/1991 | (PL) . |

\* cited by examiner

*Primary Examiner*—David M. Purol
(74) *Attorney, Agent, or Firm*—Joan Norek; Thomas Tolpin

(57) ABSTRACT

A solar-energy siding system is employed by affixing it to an exterior building surface. The system has a transparent siding element, a laminate having at least two spaced-apart ply members, a reflective member having a first orientation substantially between the siding element and the laminate, and a second orientation substantially removed from the area between the siding element and the laminate, and a mechanism for translating the reflective member between the first and the second orientations. The ply members include at least one inner light-absorbing ply member and one outer transparent ply member. The ply members each include a plurality of spacer ribs and the spacer ribs of the inner ply member are disposed crosswise of, and bear against, the spacer ribs of the outer ply member.

12 Claims, 4 Drawing Sheets

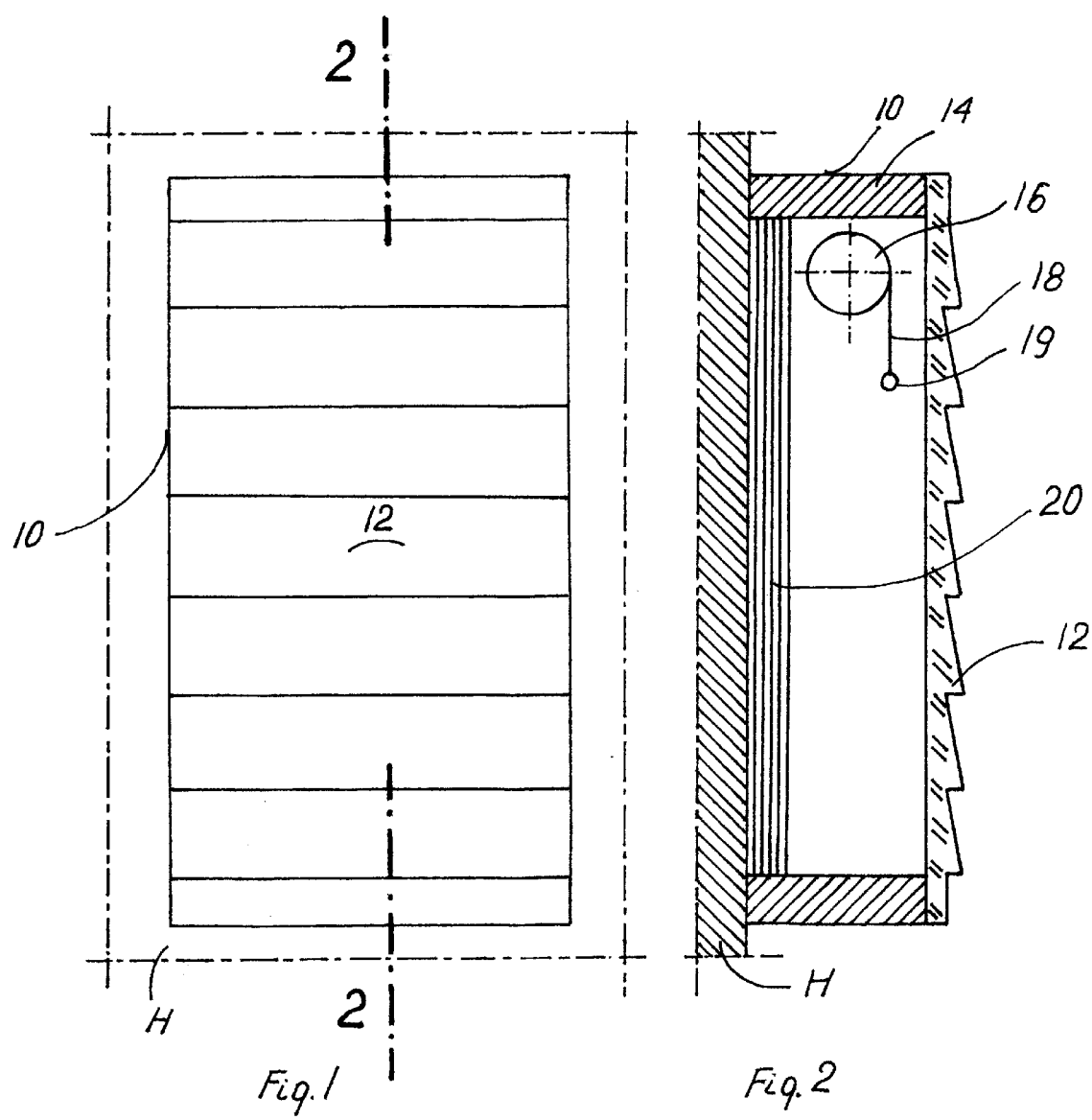

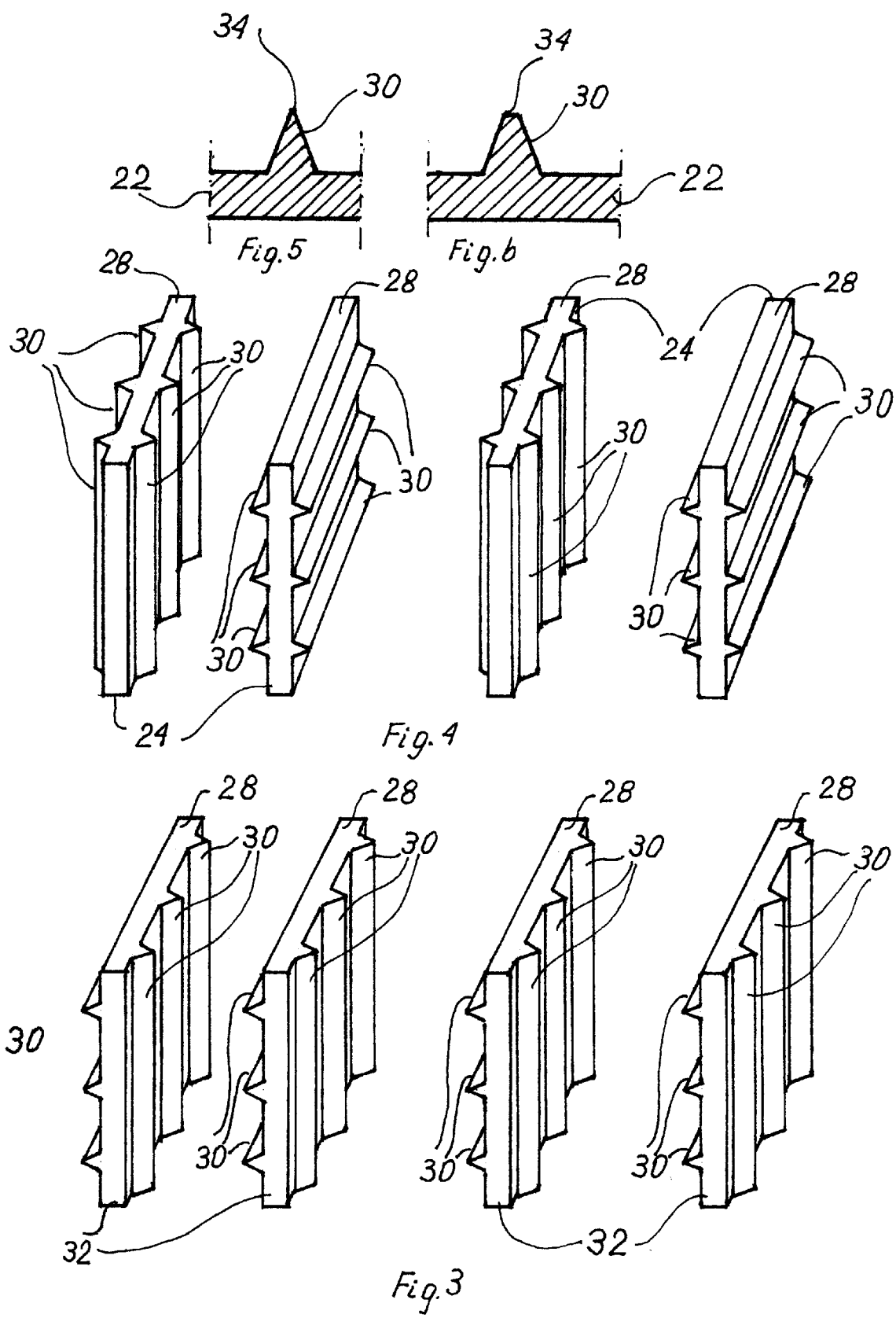

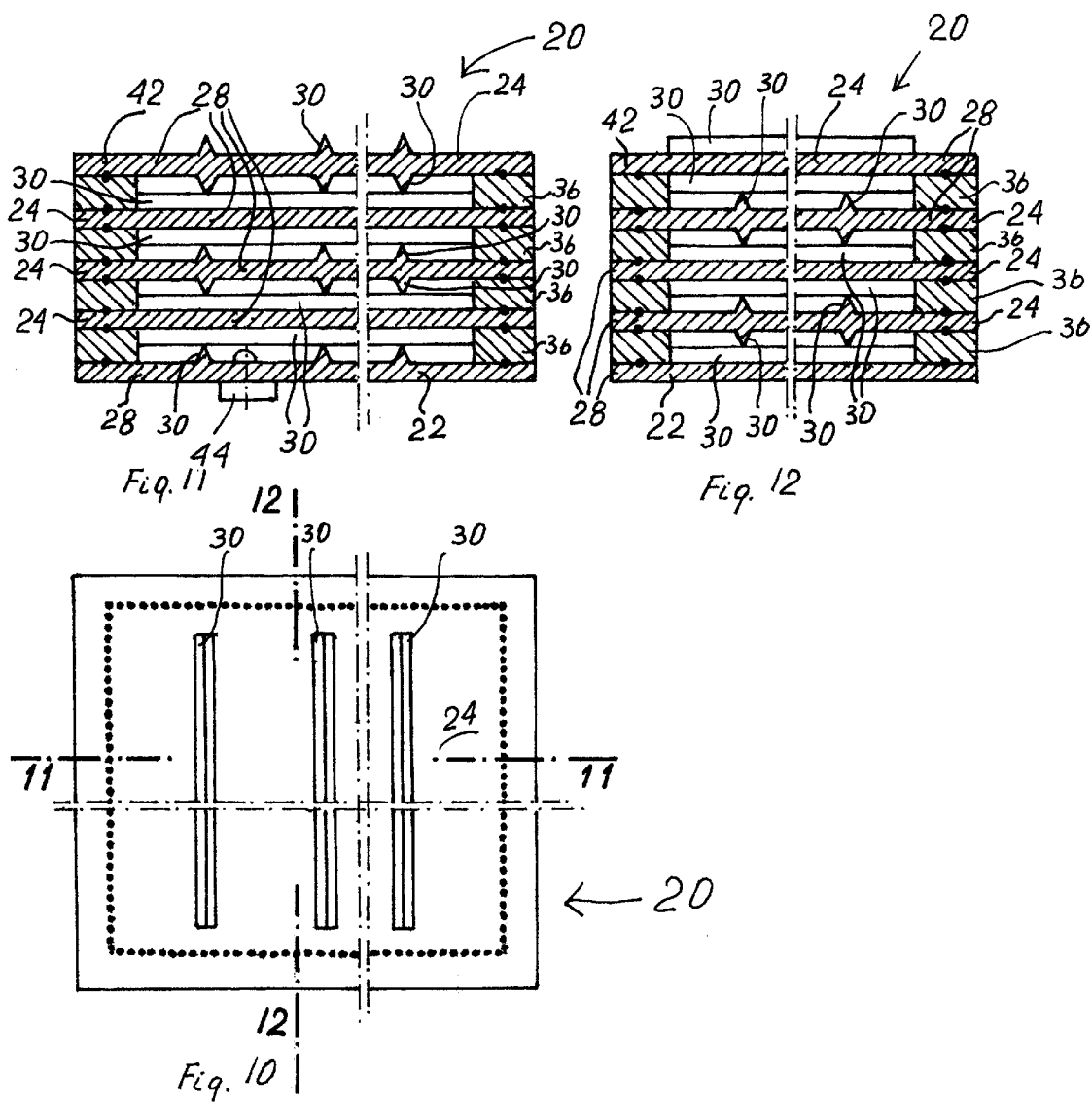

SOLAR-ENERGY SIDING SYSTEM AND ASSEMBLY

BACKGROUND OF THE INVENTION

In the building-construction or architectural field, solar energy systems are typically categorized as either passive systems or active systems. In conventional passive solar energy systems the architectural design, the natural materials and/or absorptive structures of the building are used as an energy-saving system. The building itself is used as a solar collector and storage device. An example would be thick-walled stone and adobe dwellings that slowly collect heat during the day and gradually release it at night. Passive systems require little or no investment of equipment external to the building's own structure. Conventional active solar energy systems typically require a separate solar collector, a separate storage device, and then pumps, fans etc. that draw heat from storage when it is available. Some systems are fluid-mechanical system, such as an insulated fluid-holding tank into or through which is pumped a heat-absorbing fluid medium (such as air, water, or an antifreeze solution), which fluid is circulated to distribute the collected heat energy. The size of an adequate fluid-holding tank and volume of fluid required to be in the system depends partly on the size of the building and partly on the typical number of sunless days during the heating season.

A passive solar-energy system cannot be readily installed on conventionally-constructed buildings—generally major modifications of the architectural design, the materials and/or structures of the building would be required. The installation of an active solar-energy system on conventionally-constructed buildings is also a problem, requiring not only the installation of a fluid circulation system, but also the tank, controls, fans, pumps and the like required for the collector and storage facilities. In addition, an active system often requires at least some of the equipment to be sited external to the building structure.

It is an object of the present invention to provide a solar-energy system with which an existing, conventionally-constructed building can be readily retrofitted, and which can easily be installed during building construction without incurring excessive construction costs, and which does not equipment sited external to the building structure. It is an object of the present invention to provide such a solar-energy system which is also the primary thermal insulator of the building walls, and which also both converts solar energy into heat in cold weather, such as during winter, and prevents the building from overheating during warm weather, such as during summer.

BRIEF SUMMARY OF THE INVENTION

The present invention is a solar-energy siding system is employed by affixing it to an exterior building surface. The system has a transparent siding element, a laminate having at least two spaced-apart ply members, a reflective member having a first orientation substantially between the siding element and the laminate, and a second orientation substantially removed from the area between the siding element and the laminate, and a mechanism for translating the reflective member between the first and the second orientations. The ply members include at least one inner light-absorbing ply member and one outer transparent ply member. The ply members each include a plurality of spacer ribs and the spacer ribs of the inner ply member are disposed crosswise of, and bear against, the spacer ribs of the outer ply member. The present invention also is a solar-energy siding system assembly in which the system is affixed to an exterior building surface.

BRIEF DESCRIPTION OF THE SEVERAL VIEWS OF THE DRAWING

FIG. 1 is a front view of a solar-energy siding system and assembly of the invention;

FIG. 2 is a partially diagrammatic cross-section side view of the solar-energy system and assembly of FIG. 1, taken along line 2—2 of FIG. 1;

FIG. 3 is a perspective, exploded view of at least some ply member components of the laminate component of the solar-energy system and assembly of the invention;

FIG. 4 is a perspective, exploded view of at least some ply member components of the laminate component of the solar-energy system and assembly of the invention;

FIG. 5 is a cross-section, partially cut-away view of a ply member and one of its spacer ribs of the laminate component of the solar-energy system and assembly of the invention;

FIG. 6 is a cross-section, partially cut-away view of a ply member and one of its spacer ribs of the laminate component of the solar-energy system and assembly of the invention;

FIG. 10 is a bottom plan view of a laminate panel component of the solar-energy system and assembly of the invention;

FIG. 11 is a cross-section side view of the laminate panel component of FIG. 10, taken along line 11—11 of FIG. 10; and FIG. 12 is a cross-section side view of the laminate panel component of FIG. 10, taken along line 12—12 of FIG. 10.

DETAILED DESCRIPTION OF THE INVENTION

Figure 8:
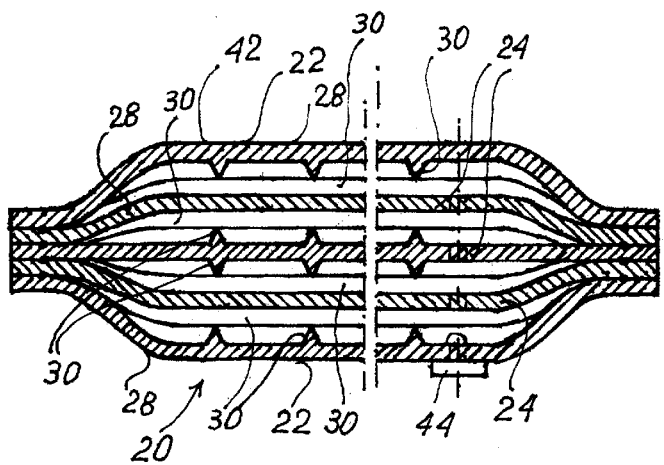
FIG. 8 is a cross-section side view of the laminate panel component of FIG. 7, taken along line 8—8 of FIG. 7.
Figure 9:
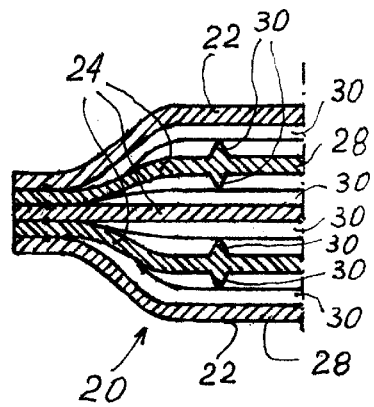
FIG. 9 is a cross-section partially-cutaway side view of the laminate panel component of FIG. 7, taken along line 9—9 of FIG. 7.
Figure 7:
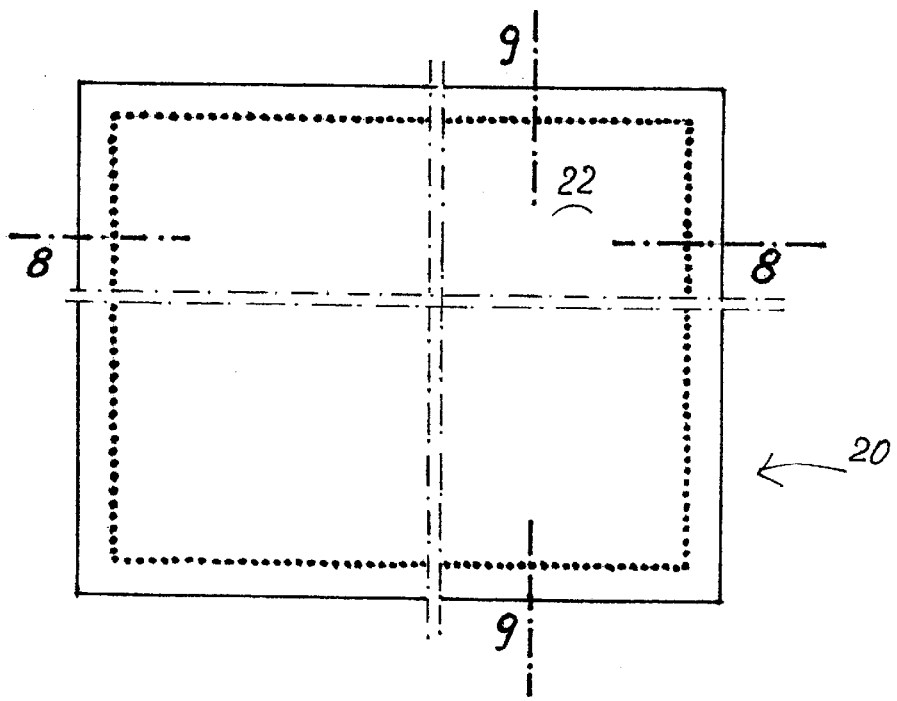
FIG. 7 is a plan view of a laminate panel component of the solar-energy system and assembly of the invention.

As shown in FIGS. 1 to 12, the present invention is a solar-energy siding system 10 which is employed by affixing it to an exterior building surface 11, such as a building's outer walls and/or roof. The solar-energy siding system 10 as shown is comprised a transparent siding element 12, casings 14, a rotary-shafted roller assembly 16 releasably holding a reflective sheet 18 which is edged with a rib 19 to weight-down the sheet 18 at its free end, and an insulation laminate 20.

The laminate 20 has, as explained below, a plurality of substantially superimposed, but substantially spaced-apart, layers or ply members. As particularly shown in FIGS. 3 to 12, there are two types of ply members which can be incorporated into a laminate 20 of the present invention, namely a single-profiled ply member 22 and a double-profile ply member 24. For simplicity, and the clarity which ensues therefrom, the same reference numbers will be used for similar or analogous components of the various embodiments shown. The single-profile ply member 22 is comprised of a substantially flat ply element 28 and a set substantially parallel and spaced-apart spacer ribs 30 or extrusions positioned on one side or face of the ply element 28. The double-profile ply member 24 is comprised of a ply element 28 and two sets of spacer ribs 30, with the first set of spacer ribs 30 positioned on one side or face of the ply element 28, and the second set of spacer ribs 30 positioned on the second side or face of the ply element 28. The spacer ribs 30 within each set of spacer ribs 30, that is, all spacer ribs 30 which are disposed on the same side of a given ply element 28, are oriented substantially parallel to, and spaced from, all other spacer ribs 30 of that set.

In FIG. 3 there is shown a second version of a double-profiled member, namely an asymmetric double-profile ply member 32 which, like the double-profile ply member 24 shown in FIG. 4, is comprised of a ply element 28 and two sets of spacer ribs 30, with the first set of spacer ribs 30 positioned on one side or face of the ply element 28, and the second set of spacer ribs 30 positioned on the second side or face of the ply element 28. All of the spacer ribs 30 of the double-profile ply member 24, that is, the spacer ribs 30 of both sets, are uni-directionally disposed, and thus all are positioned parallel relative not only every other spacer rib 30 of its set, but also relative every other spacer rib 30 of the opposite set (the spacer ribs 30 on the opposite face of the ply element 28). This directional orientation between sets of spacer ribs 30 is not found in the double-profile ply member 32. Instead the parallel orientations of spacer ribs 30 is confined to the sets, and each spacer rib 30 of one set is disposed or oriented cross-wise (perpendicular if they were lying in the same plane) to each spacer rib 30 of the other set. Both the symmetrical and asymmetrical versions of double-profiled members are components of preferred embodiments of the invention.

Each spacer rib 30 shown is elongate and has a substantially triangulate (V-shaped) cross-section profile. Such V-shaped profile is in more detail akin to an isosceles triangle, with a hypothetical base along the hypothetical flat plane of a ply element, and two equal-length sides running from the base up to an apex designated generally by the reference number 34. The apex 34 can be substantially pointed or somewhat flat. A flat apex 34 provides a stronger bearing surface and may be preferred to a pointed apex 34, particularly when the laminate component needs to withstand loading pressures.

The spacer ribs 30 are shown as elongate structures running from one edge to the opposite edge of each ply element 28, or stopping short of the edge when perimeter spacers 36 are used for enclosure (described below). One or more spacer ribs 30 in any given set could of course be interrupted at intervals, but there is believed no practical advantage ensuing from such fabrications and the structural integrity of the laminate component could suffer.

The tip or apex of each elongate spacer rib 30 forms a slender ridge. The ply members are assembled into a laminate 20 of the invention in orientations so that adjacent and facing ply member sides are disposed with their ridges in cross-wise (cross-hatch) orientation, the ridges forming two sets of crossing parallel lines, and specifically crossing substantially perpendicularly. The ridges of adjacent and facing ply members sides bear against one another at the cross-points, and substantially only at their cross-points. For instance, each downwardly-extending ridge of the top ply element 28 of a laminate 20 will cross and bear against each reach ridge projecting upward from the lower ply element 28 at some point along its length. And likewise each upwardly-projecting ridge of the lower ply element 28 will cross and bear against each ridge projecting downward from the top ply element 28 at some point along its length.

In a laminate 20 having five ply members, such as shown, the three inner or interior ply members are double-profile ply members 24 and the two outer or exterior ply members can be single-profile ply members 22, each with their spacer ribs 30 facing inward toward the adjacent double-profile ply members 24. The inclusion of a double-profile ply member 24 in an outer or exterior position permits the laminate to be spaced from an adjacent surface. The inclusion of a single-profile ply member 22 as an interior ply member would be deleterious to the performance of the present invention.

The laminate component of the solar-energy siding system 10 of the present invention has at least two ply members, and preferably has at least three ply members. In further preferred embodiments the laminate 20 has between three and about eight ply members, although there is no upper maximum other than for practical reasons, such as the number of ply members needed for a given performance, the number of ply members that can fit within a given dimensional restraint and the like. In many applications about five ply members is sufficient for insulation, handling and installation purposes, but there may well exist applications advantageously employing ten ply members, twenty ply members, a hundred ply members, etc.

The number of double-profile ply members 24 required for a laminate 20 is "x–2", wherein x is the total number of ply members of this invention in the given laminate 20. (As mentioned above, the actual number of double-profile ply members 24 could also be "x–1" or even x, same basis.) In broad embodiment, the present invention does not exclude the inclusion of layers other than the ply members described herein, provided that the performance of the ply members is not overly curbed by any such inclusions.

The spacer ribs 30 of a given set are sufficiently closely spaced to provide, together with the facing set, adequate bridging between adjacent ply members to keep adjacent ply members spaced apart substantially along the entireties of their areas, while not losing the advantage of having only a plurality of point contacts between adjacent ply members in the laminate component. In other words, instead of a laminate with overlaying, contacting layers of material, between the ply members of the laminate 20 of the present invention are pockets of air. In preferred embodiments, the solid-to-solid ply-member contact areas (which again are substantially point-contact areas) are between about 0.5 to about 5 percent, and more preferably about 1 percent, of the theoretical solid-to-solid ply-member contact area that would exist if the laminate 20 was formed with flat ply members which contacted each other substantially along their entire surface areas.

All ply members except the absorbing ply member 42 are transparent, and thus are preferably made of plastic, such as for instance polyethylene, polycarbonate, etc., or other transparent material. The absorbing ply member 42 must be light-absorbing, and therefore is either fabricated from a light absorbing material, such as one of the various ceramics, or a dark wood, or other materials, or bear a light-absorbing coating (in which instance that ply member can otherwise be transparent).

Preferably the ply members are perforated to provide a system of small but sufficient air ducts between air pockets, and then between the air pockets and the outer atmosphere. Although each air pocket preferably is not in direct air-flow communication with the outer atmosphere, no air pocket is totally isolated but instead is on the air-duct system and the air-duct system is in air-flow communication with the outer atmosphere at some point. Between adjacent ply members the spacer ribs 30 grids do not cut off air circulation between what might otherwise be considered enclosed cells, and instead air is free to flow over and under the spacer ribs 30 throughout the pocket between the perimeter closure (described below). Thus there is only one perforation or air duct required through each interior ply members to provide complete air communication throughout the interior of a laminate 20. Then there is only one perforation or air duct required through one of the two exterior ply members to provide air communication between the atmosphere and the interior of a laminate 20. In highly preferred embodiment there is an air filter 44 interposed across any perforation or air duct between the interior of a laminate 20 and atmosphere to prevent dust or other material from entering the interior of the laminate 20. Dust or other foreign material, if permitted to enter the interior of a laminate 20, would foul the laminate 20, and lead to a decrease in insulation performance.

The system of perforations or air ducts permits the maintenance of an air pressure equilibrium between the internal air pockets and the atmosphere. If there is a localized heating of the air within those air pockets, excess air can and will escape.

Thermal (and acoustical) insulation characteristics of laminate 20 are derived from the low heat-transfer coefficient at each ply-member/air-pocket boundary or interface. A laminate 20 having five ply members has substantially eight of such boundaries. There will be two of such boundaries for every interior ply member and one of such boundaries for each of the two exterior ply members. Perimeter closures (described below) generally do not possess such type of boundaries, and thus their area should be kept to a minimum.

As noted above, the laminate 20 is comprised of one light-absorbing ply member 42, the remainder of the ply members being transparent. The light-absorbing ply member 42 could be fabricated entirely of a dark material, or instead be itself transparent with a dark, light-absorbing coating on one side. The ply members are preferably and normally arranged in a solar-energy siding system 10 so that the light-absorbing ply member 42 or its dark coating is positioned in contact with, or spaced-from but adjacent, the exterior building surface 11, and thus within the laminate 20 the coating would be positioned on the exterior side of one of the exterior ply members (and then of course installed in the desired orientation). Light is transmitted through the transparent ply members to the light-absorbing coating. When heat is not desired, for instance during warm weather, the laminate 20 as a whole can be shielded from sun light by the reflective sheet 18, and then the laminate 20 continues to function as an effective thermo-insulator.

Each section or panel or cell of laminate 20 is closed at its perimeter by compression and then welding or sewing or other thermal, chemical or mechanical method desired or applicable given the fabrication material selected for the ply members. Alternatively, in some applications the perimeter spacers 36 are inserted between each pair of adjacent ply members to form a complete perimeter closure, and then the spacers 36 and ply members are joined by welding or sewing or other thermal, chemical or mechanical method desired or applicable given the fabrication material selected for the ply members and/or spacers 42. The actual dimensions of a given laminate 20 panel depends on many factors, and should be selected to ensure that the air pockets survive normal handling. If a sheet of laminate larger than a single panel cell is desired, one or more panels can be interconnected by conventional means such as welding or sewing or other thermal, chemical or mechanical method desired or applicable given the fabrication material selected for the ply members.

In the solar-energy siding system 10 the siding element 12 is the exposed surface, and can be formed as a stepped arrangement of separate boards or as a unitary prefabrication or in any other conventional way. The siding element 12 functions as a conventional siding to shield the underlying structure(s) from environmental influences such as rain, snow, wind etc. Unlike conventional sidings, however, the siding element 12 is transparent.

The roller assembly 16 supports the reflective sheet 18 and stores the reflective sheet 18 in a rolled-up position when the reflective sheet 18 is not being used to shield the laminate 20. The roller assembly 16 can be of any conventional retractable roller mechanism, for instance such as those in common use for holding window shades. The roller assembly 20 can be positioned in any convenient spot within the solar-energy siding system 10, such as between the laminate 20 and the siding element 12 as shown, or somewhat above the laminate 20, provided that the reflective sheet 18 can be moved from a stored position on the roller assembly to an unfurled position in which the reflective sheet 18 is positioned between the laminate 20 and the siding element 12.

The solar-energy siding system 10 is shown simply in an embodiment in which the unfurling of the reflective sheet 18 and its retraction is a by-hand operation. Therefore a sufficient degree of access to the reflective sheet 18 is required, which can be provided by detachment of for instance the bottom casing 14, or by swinging open the siding element 12 (in which instance obviously the siding element 12 would require conventional hinging along one side and probably conventional closure mechanisms, such as mechanical fasteners, along other sides). Other methods for translating the reflective sheet 18 from an operational orientation to a storage orientation can of course be envisioned, such as conventional motors turning the roller assembly one direction or the other in response to conventional switches. The present invention in broad embodiment is not limited to any specific method or implementing structure for translating the reflective sheet 18 from an operational orientation to a storage orientation. The reflective sheet 18 is of course moved to its shielding position during warm weather when heating is not desired, and there it not only prevents sunlight from reaching the light-absorbing ply member 42, it reflects light out through the siding element 12. The reflection of light away from any absorbing materials is more effecting than conventional sidings, even those painted in light colors. In addition, the laminate 20 insulates the exterior building surface 11 from exterior heat both in cold and warm weather. The laminate 20 also insulates the absorbing ply member 42 when the laminate 20 is unshielded, thus diminishing heat from dissipating outwardly.

Preferred materials for the reflective sheet 18 include metal foil, and any other material with an opaque and possibly glassy or shiny surface.

The casings 14 of course merely protect the internal components of the solar-energy siding system 10, and they can be fabricated of most any desired material.

The solar-energy siding system 10 the present invention provides a solar-energy system with which an existing, conventionally-constructed building can be readily retrofitted, and which can easily be installed during building construction without incurring excessive construction costs, and which does not require equipment sited external to the building structure. The solar-energy siding system 10 of the present invention provides such a solar-energy system which is also the primary thermal insulator of the building walls, and which also both converts solar energy into heat in cold weather, such as during winter, and prevents the building from overheating during warm weather, such as during summer.

It is well within the skill of a person in the technical field, upon becoming conversant with, or otherwise having knowledge of, the present invention, to select suitable combinations of material and components and the like in view of the type of solar-energy siding system being designed and/or constructed.

The above described embodiments are exemplitive, and the terminology is employed for illustration purposes and not limitation purposes. The present invention is not limited to the combinations and subcombinations illustrated herein.

We claim:

1. A solar-energy siding system which is employed by affixing it to an exterior building surface, comprising:
   a transparent siding element;
   a laminate having at least two spaced-apart ply members, said ply members including at least one inner light-absorbing ply member and one outer transparent ply member;
   a reflective member having a first orientation substantially between said siding element and said laminate, and a second orientation substantially removed from the area between said siding element and said laminate;
   means for translating said reflective member between said first and said second orientations; and
   wherein said ply members each include a plurality of spacer ribs and said spacer ribs of said inner ply member are disposed crosswise of, and bear against, said spacer ribs of said outer ply member.

2. The solar-energy siding system of claim 1 wherein said reflective member is a flexible reflective sheet.

3. The solar-energy siding system of claim 1 wherein said reflective member is a flexible reflective sheet and further including a roller assembly supporting said reflective sheet at least in said first orientation.

4. A solar-energy siding system which is employed by affixing it to an exterior building surface, comprising:
   a transparent siding element;
   a laminate having at least three spaced-apart ply members, said ply members including at least one inner light-absorbing ply member, at least one interior transparent ply member and one outer transparent ply member;
   a reflective member having a first orientation substantially between said siding element and said laminate, and a second orientation substantially removed from the area between said siding element and said laminate, and
   means for translating said reflective member between said first and said second orientations.

5. The solar-energy siding system of claim 4 wherein said reflective member is a flexible reflective sheet.

6. The solar-energy siding system of claim 4 wherein said reflective member is a flexible reflective sheet and further including a roller assembly supporting said reflective sheet at least in said first orientation.

7. The solar-energy siding system of claim 4 wherein said inner and outer ply members each include a set of spacer ribs,
   wherein said interior ply member includes two sets of spacer ribs,
   each set of spacer ribs is positioned on one side of one of said ply members,
   each set of spacer ribs is comprised of a plurality of spacer ribs positioned in substantially parallel alignment, and
   wherein said spacer ribs of said ply member are disposed crosswise of, and bear against, said spacer ribs of each adjacent ply member.

8. A solar-energy siding system assembly comprising,
   an exterior building surface;
   a transparent siding element;
   a laminate having at least two spaced-apart ply members, said ply members including at least one inner light-absorbing ply member and one outer transparent ply member;
   a reflective member having a first orientation substantially between said siding element and said laminate, and a second orientation substantially removed from the area between said siding element and said laminate;
   means for translating said reflective member between said first and said second orientations; and
   wherein said ply members each include a plurality of spacer ribs and said spacer ribs of said inner ply member are disposed crosswise of, and bear against, said spacer ribs of said outer ply member.

9. The solar-energy siding system assembly of claim 8 wherein said inner ply member is in contact with said exterior building surface.

10. The solar-energy siding system assembly of claim 8 wherein said inner ply member is spaced-apart from and adjacent said exterior building surface.

11. The solar-energy siding system of claim 8 wherein said reflective member is a flexible reflective sheet.

12. The solar-energy siding system of claim 8 wherein said reflective member is a flexible reflective sheet and further including a roller assembly supporting said reflective sheet at least in said first orientation.

* * * * *